United States Patent Office 3,748,185
Patented July 24, 1973

3,748,185
RETRACTABLE AND VENTILATED BATTERY
HOLDER WITH SPECIAL SWITCHING SYSTEM
John Cooper, 13 Mohawk St.; and George Stubbert, 198
 Catharine Ave., both of Brantford, Ontario, Canada;
 and William Shepperd, 4 Chestnut St. E., St. Catharines,
 Ontario, Canada
Filed Mar. 16, 1971, Ser. No. 124,742
Int. Cl. H01m 1/04
U.S. Cl. 136—173                                        2 Claims

ABSTRACT OF THE DISCLOSURE

A retractable and ventilated battery holder using special contact rings for insertion between the batteries which, by the manual operation of an end stud, permits the power to be turned on or off and the batteries to be isolated when idle.

---

The invention relates to a dry cell battery holder or case by the use of which battery corrosion and deterioration is greatly reduced.

Corrosion is commonly experienced in dry cell batteries which are confined in holders or cases that are covered and unventilated. One outstanding example is the hand operated, everyday flashlight that is generally found without sufficient air vents. Air has seeped into these battery holders or cases and through the natural process of condensation has changed into a humid, water-laden mass of air. Surrounded by this damp air the batteries are attacked by corrosion and the batteries soon become unusable. The obvious cure here would be to apply air vents to the battery holder or case which would let the damp air off and the dry air to circulate.

Another matter to consider is the deterioration or "going dead" of the battery before its natural life span has been reached. This condition occurs when a defective or leaky battery is placed adjacent to a battery which may be proven to be good. The leaky battery acts as an added load to the good battery and causes the latter to become depleted sooner than it would if the battery were not in the circuit at all.

We have found that the way to overcome the above faults is to design and arrange a system of contacts that, in their action, each individual battery in the applied set or series would become isolated and out of contact with an adjacent battery so that the chain action of deterioration as well as corrosion would become broken while the batteries were idle. With the system of contacts referred to above and with the additional feature of a holder or case comprised of two (or more) retractable and ventilated sections to allow the use of two or four (or more) dry cell batteries the availability of a most efficient unit would be realized.

Figure 1:
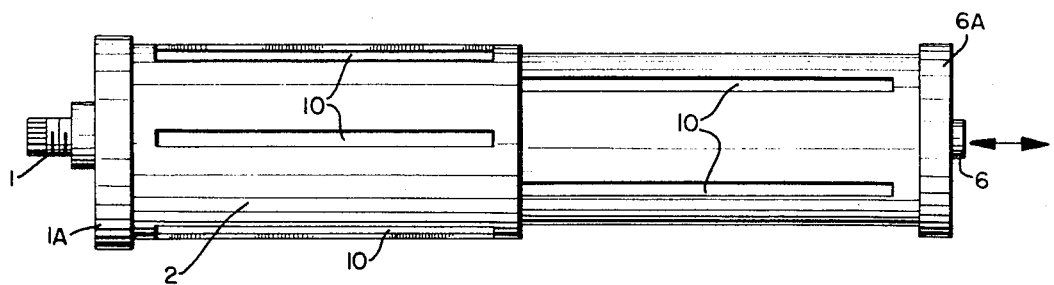
Figure 2:
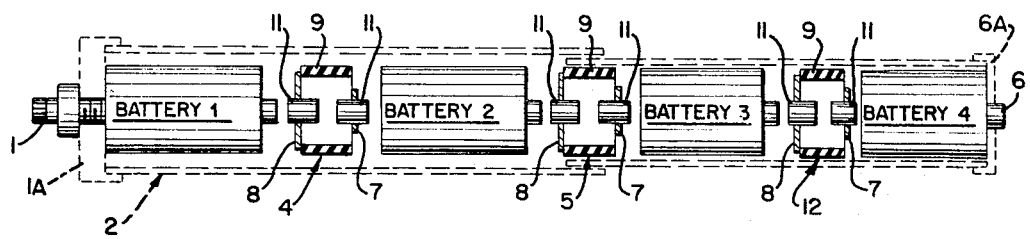
Figure 3:
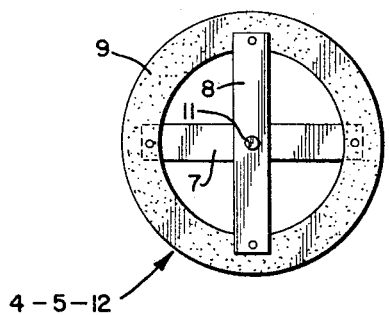
Figure 4:
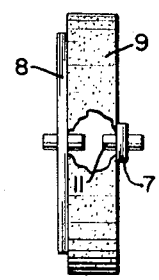

In drawings which illustrate embodiments of the invention, FIG. 1 is a side elevation of one embodiment, FIG. 2 is a phantom view of the relative positions maintained by the items comprised in an additional embodiment and FIG. 3 is a plan view of the front and FIG. 4 is a plan view of the side of the system of contacts referred to.

The battery holder or case illustrated in FIG. 1 is comprised first of sections which are made to telescope one within the other and having open slots for the circulation of air around the batteries, these air vents being numbered 10 in the drawing. In practice each retractable section would contain two dry cells, giving a multiple of number of batteries when the sections are fully extended. For two batteries the sections would be collapsed to suit the arrangement.

Referring to FIG. 2, 1 represents a metal screw-type stud located in one end of the battery holder 2. When this stud is turned inwards the action brings it against the negative case of the battery marked BAT. 1. This pushes the battery ahead so that its positive presses together the contacts 11 of contact ring 4. As the screw-type metal and stud continues to turn the action in its movement pushes BAT. 2 against contacts 11 of contact ring 5, thus, with contacts 11 of contact ring 12 being acted upon in a like manner, closing the battery circuit and placing power at point 6.

FIG. 3 represents the contact ring referred to above, 9 being a ring of insulation material to which is attached two cross-pieces, 7 and 8, of spring brass having metal contacts 11. These contact rings have the same diameter as the dry cells used and are removable at will, one being needed for two batteries and three being needed for four batteries. Specifically, the material used for the cross-pieces 7 and 8 should be of such tension as to overcome the weight of the batteries.

The battery holder or case presented herein may be used anywhere batteries of the penlight or flashlight type are to be properly and efficiently used. For one thing, if the design and arrangement as described here were applied to the common flashlight, to mention only one of its many uses, a worthwhile improvement would be realized:

(1) The heavy spring used for connection and for keeping the batteries tight in the common holder is eliminated. This spring is of steel and a poor conductor at best.

(2) The elimination of the unsure push switch generally used is possible. In time, due to continued use, dust and oxidation, this switch becomes too frequently defective.

(3) uncommon to the general custom, excepting in the contact rings mentioned here, insulation is not used anywhere in the construction.

(4) The proper ventilation of the batteries and their physical isolation when idle tends to give the batteries longer life.

(5) The versatility of the retractable arrangement available in the battery holder or case we offer here, which gives a more useful and wider choice in the number of batteries taken by the device, is clearly defined.

Due to the variety of sizes and shapes of the batteries now available on the market specific constructional details cannot be given here, other than to point out that the battery holder or case should be fabricated entirely from metal, each retractable section capable of holding two batteries as well as the required number of contact rings marked 4–5–12 in the drawing, FIG. 3. These contact rings are made up of fiber or other insulation material 3/16-in. thick having a mean diameter equal to that of the batteries to be used, the cross-pieces of spring metal, 7 and 8, being mounted with rivets so that their ends are away from the edge of the ring of insulation to prevent shorting to the metal holder or case, as shown in FIG. 3.

It may be seen that, since the threaded metal stud 1, FIGS. 1 and 2, is located at one end of the battery holder or case and manually operated by a rotating movement, it is adapted to behind-the-panel installation. Use of the battery holder or case is simple: threaded cap-piece 6A is first attached. This cap-piece of metal has a circular opening in its center larger than the positive pole but smaller than the diameter of the battery to allow access to the battery's positive connection and serving to retain the batteries in the case. The batteries and the contact rings 4–5–12 are loaded into the holder in an alternate fashion, first a battery, positive end first, then a contact ring, and so on. There will be one less contact ring than there are batteries in the completed loading. The threaded cap-piece 1A, carrying its threaded metal stud 1, is then attached. Turning of metal stud 1 pushes the batteries ahead within the case and "squeezes" the contacts 11 attached to spring arms 7 and 8 together to close the power circuit. Reversing the turning direction of metal stud 1 permits contacts 11, by reason of the tension of spring arms 7 and 8 to move apart. It is possible to so finely adjust metal stud 1 in actual operation that the merest fraction of a turn one way or the other is alone necessary to turn the power on or off.

To use the case as a flashlight it is only required to remove cap-piece 6A and replace it with a standard assembly head supplied with lamp, reflector and glass.

We claim:

1. A metal battery holder or case having retractable sections and having air vents in each retractable section to aid in the free circulation of air around the batteries contained therein.

2. A battery holder or case as described in claim 1 having a contact system comprised of two contact-bearing cross-pieces of spring material aligned and attached to alternate sides of rings of insulation material for insertion between the negative connection of the one battery and the positive connection of the other adajcent battery, the central contacts of said insulated contact rings being brought together to close the electrical circuit by the forward movement of a threaded metal stud, a reverse movement of the same threaded metal stud allowing the central contacts, due to the spring tension present to adopt their former open position against the weight of the batteries, resulting in a condition at that instance wherein it may be said that each individual battery contained in the battery holder or case becomes, physically and electrically isolated.

References Cited

UNITED STATES PATENTS

| | | | |
|---|---|---|---|
| 2,029,861 | 2/1936 | Dabgin | 136—110 |
| 2,468,430 | 4/1949 | Derksen | 136—173 |
| 2,522,012 | 9/1950 | Alexander | 240—10.6 R |
| 2,643,327 | 6/1953 | Macklenar | 240—10.66 |

FOREIGN PATENTS

| | | | |
|---|---|---|---|
| 607,172 | 6/1926 | France | 136—173 |

DONALD L. WALTON, Primary Examiner

U.S. Cl. X.R.

136—181